US010845681B1

(12) United States Patent
Buice (10) Patent No.: US 10,845,681 B1
(45) Date of Patent: Nov. 24, 2020

(54) CAMERA APPARATUS FOR HIDING A CAMERA OPERATOR WHILE CAPTURING 360-DEGREE IMAGES OR VIDEO FOOTAGE

(71) Applicant: Stephen Michael Buice, San Diego, CA (US)

(72) Inventor: Stephen Michael Buice, San Diego, CA (US)

( * ) Notice: Subject to any disclaimer, the term of this patent is extended or adjusted under 35 U.S.C. 154(b) by 0 days.

(21) Appl. No.: 16/995,665

(22) Filed: Aug. 17, 2020

(51) Int. Cl.
G03B 17/56 (2006.01)
(52) U.S. Cl.
CPC ......... *G03B 17/561* (2013.01); *G03B 17/565* (2013.01); *G03B 17/563* (2013.01)
(58) Field of Classification Search
USPC .................................. 396/419, 427
See application file for complete search history.

(56) References Cited

U.S. PATENT DOCUMENTS

| | | | | |
|---|---|---|---|---|
| 4,174,162 | A * | 11/1979 | Giacomini | B64D 47/08 396/12 |
| 5,130,794 | A | 7/1992 | Ritchey | |
| 7,726,888 | B2 | 6/2010 | Amira et al. | |
| 8,941,777 | B1 | 1/2015 | Ratner | |
| 8,994,776 | B2 | 3/2015 | Sutherland et al. | |
| 9,413,930 | B2 | 8/2016 | Geerds | |
| 9,773,350 | B1 | 9/2017 | Crosby | |
| 10,467,810 | B1 | 11/2019 | Yang | |
| 2004/0223752 | A1 * | 11/2004 | Ghanouni | G03B 17/00 396/419 |
| 2006/0000499 | A1 * | 1/2006 | Livacich | E04H 15/04 135/90 |
| 2007/0089929 | A1 * | 4/2007 | Schriewer | E06C 5/00 182/127 |
| 2016/0195798 | A1 | 7/2016 | Nenov | |
| 2017/0353658 | A1 | 12/2017 | Colin | |
| 2020/0256633 | A1 * | 8/2020 | Keller | F41B 5/1426 |

FOREIGN PATENT DOCUMENTS

| | | |
|---|---|---|
| CH | 710095 A | 3/2016 |
| CN | 203241688 U | 10/2013 |
| CN | 205792907 U | 12/2016 |
| CN | 106935150 A | 7/2017 |
| EP | 2913796 B1 | 3/2019 |
| JP | 2002333684 A | 11/2002 |
| KR | 101173618 B1 | 8/2012 |
| WO | 2003046632 A1 | 6/2003 |
| WO | WO-2008103133 A2 * | 8/2008 ............... F41H 5/08 |

* cited by examiner

*Primary Examiner* — Rodney E Fuller
(74) *Attorney, Agent, or Firm* — Wagenknecht IP Law Group, PC (57) ABSTRACT

A camera apparatus for hiding a camera operator while continually walking/moving and recording 360-degree images or video, the apparatus including a frame having upper and lower arcuate members that define an operator cavity; and a support member positioned within the cavity that includes a means for carrying the apparatus by the camera operator; a front barrier following the arcuate members that substantially prevents viewing into the cavity, the front barrier having an upper segment that extends downward from the upper arcuate member and permits one way viewing out of the operator cavity; and a rod movably mounted to the frame and extending forward through the front barrier that is configured for attachment to a camera that captures 360-degree images or video.

18 Claims, 11 Drawing Sheets

CAMERA APPARATUS FOR HIDING A CAMERA OPERATOR WHILE CAPTURING 360-DEGREE IMAGES OR VIDEO FOOTAGE

TECHNICAL FIELD

The invention relates to a camera apparatus for hiding a camera operator while capturing 360-degree images or video.

BACKGROUND OF THE INVENTION 360-degree cameras are increasingly used in a variety of environments, from security monitoring to home tours. 360-degree cameras (also called omni directional cameras) have a 360-degree field of view, which captures just about everything around the camera.

When used for home tours, 360-degree cameras are conventionally mounted upright to a tripod so that opposing camera lenses face forwards and backwards. The tripod is placed in a first position and a 360-degree image is captured. The tripod is moved to a second position, which is generally in view from the first position, and a second 360-degree image is captured. This process of moving the tripod to a next position and capturing another 360-degree image is sequentially performed until the entire environment has been scanned. The images are then digitally stitched to create what is often referred to as a 360 Tour. Many companies have arrows pointing towards the possible directions that have been scanned by the camera/operator. This allows the viewer to move from position to position and select the desired view, such as by moving the displayed image with a finger, left to right or up to down, in any direction on a mobile device. While this process can digitally recreate a property, it is very labor intensive and has numerous limitations.

For example, the above process is labor intensive in that the camera operator must move the camera and tripod from position to position, and before capturing each image must leave the field of view of the camera. This is generally performed by leaving the room and actuating the camera remotely. The camera operator then returns to the camera, repositions it, and hides again before capturing another image. This is typically repeated until all images are captured.

In addition to the extensive labor involved, this approach is limited in that the viewer must further imagine what it must be like to move fluidly through the property from the sequential stopping and starting from each fixed position captured by the camera. That is, this approach operates by selecting a series of stopping points throughout the environment. It does not provide a video tour.

Another approach is for a camera operator to conduct a real time video tour using a mobile phone operably linked to the viewer's mobile phone so that the viewer can direct the camera operator how to proceed (e.g. Facetime Live). However, this approach is also labor intensive in that the camera operator can only conduct one tour at a time. Moreover, the viewer must direct the movement of the camera operator, such as instructing the operator to turn left, turn right, go down the hall, turn around, etc.

Therefore, there remains a need to provide an improved method of viewing properties remotely that is less cumbersome and time consuming than is currently available and that does not reveal the camera operator nor the camera while walking or touring the environment.

SUMMARY OF THE INVENTION

The invention solves the above described problems and provides related benefits. In particular, the problem is solved in one aspect of the invention by the development of a camera apparatus, which hides a camera operator while recording 360-degree images or video, even while recording towards the camera operator himself/herself. The camera apparatus includes a frame having upper and lower arcuate members, each arcuate member having an arc of about 180 degrees, thereby forming an operator cavity. The support member, which is positioned within the cavity, includes a means for carrying the apparatus by the camera operator while recording. A front barrier follows the arcuate members to substantially prevent viewing (e.g. about 98% blockage) into the cavity. The front barrier has an upper segment that extends downward from the upper arcuate member and permits one way viewing out of the operator cavity; and a lower segment that extends downward from the lower arcuate member A rod, which is coated with a reflective material, is itself reflective or fed through a reflective sheath, is movably mounted to the frame and extends forward through the front barrier. The distal end of the rod is configured for attachment to a camera that captures 360-degree images or video, such as by using complementary threaded surfaces. The camera is oriented so that its two opposing half dome lenses face upwards and downwards. The rod has a mirrored outer surface or is fed through a reflective sheath along its length, thereby masking the presence of the rod within the captured footage. An opaque covering is positioned over and behind the frame, thereby forming a top and rear member to darken the cavity. The camera is also hidden by mirrors that are attached to the sides of the camera. This provides for additional camouflage of the camera because a mirror reflects only light and not the camera. It is in essence hidden no matter if a mirror is in the room or filming area.

In some embodiments, the frame has a fixed height but in preferred embodiments, the frame has adjustable height pieces of piping that adjust the relative distance between the upper and lower arcuate members.

Preferably, the camera apparatus is configured for disassembly and reassembly to facilitate transport between recording locations. When disassembled the camera apparatus is preferably configured for storage in a container sized 30 inches×24 inches×9 inches. This size is a typical suitcase size used for air travel.

The support member preferably includes support rods so that when holding the frame during recording, the support rods rest on the camera operator's forearms for additional support.

Preferably the support member also includes two handgrips and more preferably, the handgrips are configured as pistol grips. The support member can also include a holder for a personal computing device, such as a mobile phone, tablet computer or laptop computer, which may operably link to the camera to control recording. The support member also preferably has feet for standing the recording apparatus on a table when not in use.

The front barrier can be a single barrier with two or more distinct segments that are fused together or integral with one another or can be two or more segments that are separate or separable from one another. In either form, the upper segment, which generally hides the operator's torso and head, is configured to permit viewing out of the cavity but substantially (e.g. 98%) prevents viewing into the cavity. This can be accomplished by forming the upper segment using a two-way mirror(s), which is reflective on one side and transparent on the other side or using a one-way window film that coats a transparent window. In some embodiments, the window film is a perforated window vinyl. In some embodiments, the upper segment includes advertising indicia that is viewable outside of the camera apparatus.

The lower segment extends downward from the frame and hides the operator's legs and feet. In some embodiments, the lower segment is formed from a fabric skirt with a weighted bottom. In some embodiments, the lower segment is a fabric skirt with means for height adjustment, thereby preventing the operator from tripping over the skirt when moving throughout the environment.

The rod extends outward through the lower segment of the front barrier and is preferably slidably positioned through a rigid sleeve that is mounted to the frame. Most preferably, the rod extends from about 6 inches to 9 feet in front of the front barrier and about midway between the top and bottom of the camera apparatus when recording the environment. Preferably, the rod extends through the lower segment of the barrier, such as through a hole in the fabric.

The opaque covering, which helps darken the interior of the cavity, forms the top of the apparatus and drapes downward over a portion of the rear. The opaque covering can be formed of an opaque fabric. The opaque covering can be at least in part, cardboard, corrugated cardboard, corrugated plastic, and/or fabric. Preferably, the front region of the top is pulled taught and the rear region drapes over the back behind the operator's head to about the middle of the back. Extension members extending rearward from the upper arcuate member of the frame can assist with the rear positioning of the opaque covering.

In preferred embodiments, the camera apparatus has suitable connectors to connect a 360-degree camera at the distal end of the rod so that the camera's half dome lenses face upwards and downwards. In other embodiments, the 360-degree camera forms part of the apparatus. In further embodiments, the camera is wrapped with a reflective covering.

In a related aspect of the invention, a method of capturing a 360-degree image or video tour of an environment without capturing the camera operator in the footage is provided, the method including: mounting a 360-degree video camera to the rod of the camera apparatus as described herein so that the opposing half dome lenses face upwards and downwards; and carrying the camera apparatus throughout the environment by means of the support member while recording 360-degree images or video, where the camera is maintained in front of the camera operator and between about waist and chest height. When recording, the camera operator and the rod will be hidden from the recorded footage. When the camera is wrapped in reflective covering it will also be hidden from the recorded footage.

BRIEF DESCRIPTION OF THE DRAWINGS

Embodiments of the invention can be better understood with reference to the following drawings, which represent preferred embodiments. The components in the drawings are not necessarily to scale, the emphasis instead being placed upon illustrating the principles of the invention. And, in the drawings, like reference numerals designate corresponding parts throughout the several views.

DETAILED DESCRIPTION OF PREFERRED EMBODIMENTS

Beginning collectively with FIGS. 1-12, what is described is a camera apparatus 10 for hiding a camera operator 1 while recording 360-degree images or video. The term "recording" as used herein refers to capturing one or more still images or a video, which is itself a series of images or frames taken over a short period of time. The term "recording" as used herein is meant to include image capture on film, digital capture into memory, as well as image or video streaming over a network.

The apparatus 10 will be particularly useful in instances where 360-degree video is captured, such as for virtual tours of different environments (e.g. homes, businesses, local or national parks). 360-degree video, also known as immersive video or spherical video, is a video recording where a view in every direction is recorded at the same time using an omnidirectional camera 75 or collection of cameras 75. More specifically, my 360 camera 75 has a top and a bottom half dome lens 76A, 76B pointing upwards and downwards, not forwards and backwards. In contrast, 360 cameras 75 are conventionally pointed forwards and backwards—not upwards and downwards. All other technologies use forward and backward lens orientation/approach to capture their images or video. During playback on normal flat display, the viewer has control of the viewing direction at all times.

Since the object of the invention is to capture complete images/video of an environment while excluding the camera operator 1, rod 64 and camera 75 from the captured footage, the camera apparatus 10 has been developed to mask the presence of the camera operator 1 and change the camera 1 positioning to horizontal (shooting upwards/downwards) from vertical (shooting forwards/backwards) unlike all other inventions.

Turning now more specifically to FIGS. 1-9, a camera apparatus 10 is described, which forms a cavity 12 behind a front barrier 14, which is sized for hiding the camera operator 1 and being slim enough for the apparatus 10 to easily make it through typical doorways of homes. As will be described in more detail in the passages that follow, those outside of the cavity 12, including individuals or in particular an outward extending 360-degree camera 75, cannot substantially view through the barrier 14 and into the cavity 12. The phrase "cannot substantially view through the barrier and into the cavity" means that under ordinary daylight or fluorescent lighting, an individual standing about two to three feet away from the barrier 14 cannot ordinarily see the camera operator 1 positioned within the cavity 12. Nor can the viewer of the video see the operator 1.

The front barrier 14 is held by way of a frame 16. In particular, the frame 16 has upper and lower arcuate members 18, 20 used to guide the front barrier 14 along an arced path in front of and around the camera operator 1, thereby forming a cavity 12 for the camera operator 1. In preferred embodiments, the arcuate members 18, 20 are each formed from a lightweight material, such as a rigid polymer plastic, aluminum, metal or metal alloy, or wood. The arced path extends until the camera operator 1 is no longer in view on the 360-degree recording being captured, which is conducted by extending the camera 75 outward and in front of the front barrier 14, generally between six inches to nine feet. However, preferably the arced path is small enough so that the camera operator 1 can exit the rear of the apparatus 10. Thus, the arcuate members 18, 20 each have an arc of about 180 degrees, which means each arc is 180 degrees or at least 135 degrees. In some embodiments each arc is at least 145 degrees but less than 215 degrees. More preferably each arc is at least 150 degrees, at least 160 degrees, at least 170 degrees, at least 175 degrees, 180 degrees, 180 degrees to 185 degrees or 185 degrees to 195 degrees, but preferably less than 220 degrees, 210 degrees or 200 degrees. The skilled artisan will appreciate that the arc could be a continuous circle, which itself includes two arcs of about 180 degrees, though this approach may require additional hinges or attachments to open and close a rear door to permit ingress or egress of the camera operator 1. The skilled artisan will also appreciate that the arc does not have to be partially circular. In particular, the arc is preferably a flattened arc or parabolic arc with the vertex being positioned generally forward. The arc can be smooth without corners or can have two or more segments joined by corners to follow an arced path.

Figure 11:
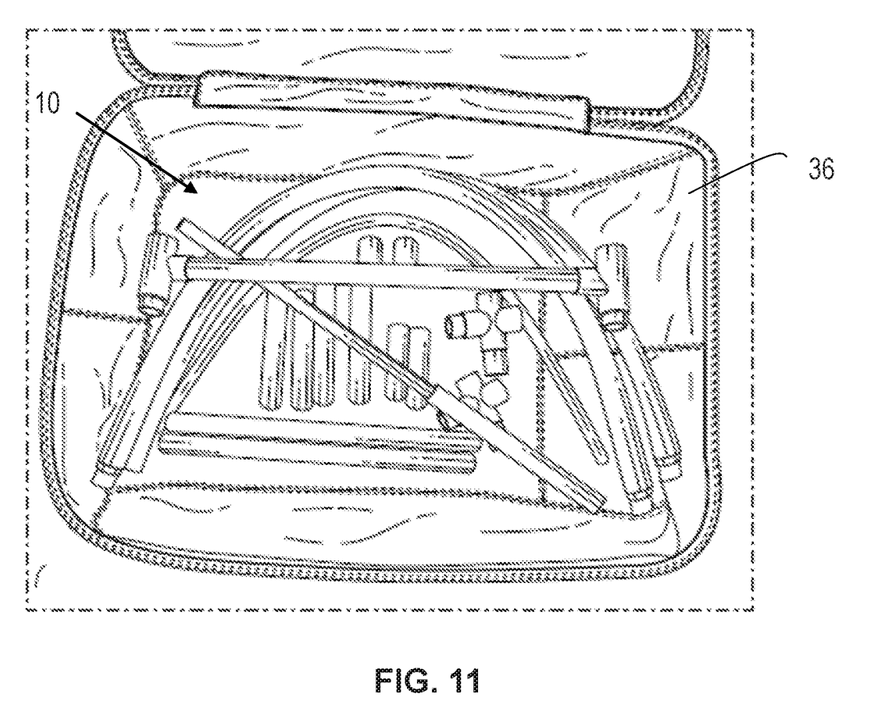
FIG. 11 demonstrates the storage of a collapsed apparatus in a container 36 for travel.
Figure 12:
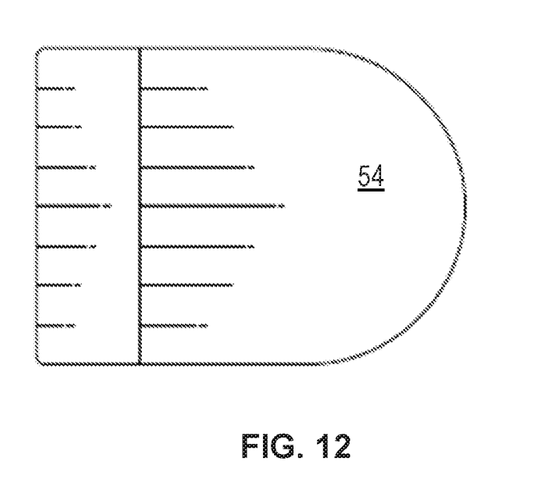
FIG. 12 provides a top view of the opaque covering 54.

Within the cavity 12, the camera operator 1 controls movement of the apparatus 10 through the environment in need of recording by carrying the frame 16 while walking in various directions. Shown more clearly in FIG. 6 and FIG. 10, the frame 16 includes a support member 22, which generally provides support and stability of the apparatus 10 by connecting opposing end regions 24A, 24B of the lower arcuate member 20 of the frame 16. Similarly, opposing end regions 26A, 26B of the upper arcuate member 18 are connected to one another by way of a transverse rod 28, and same end regions 26A, 24A (26B, 24B) of the upper and lower arcuate members 18, 20 are connected to one another by vertical rods 30A, 30B. Connections can be by way of suitable fittings, such as T-fittings or cross fittings 34. Preferably, the frame 16 is collapsible such as removing the upper and lower arcuate members 18, 20, support member 22, transverse rod 28, and vertical rods 30A, 30B from corresponding fittings. As shown in FIG. 11, when collapsed, preferably the apparatus 10 can be stored in a container 32 or travel case sized about 30 inches×24 inches×9 inches. Turning back to FIG. 5 and FIG. 10, in some embodiments, the vertical rods 30A, 30B are not only collapsible but also adjustable in length such that the height of the frame 16 can be adjusted. A variety of mechanisms are known in the art to accomplish height adjustment including, but not limited to, telescopic configurations, rotation of a screw rod, as well as various locking adjustments.

The support member 22 also preferably includes a means for carrying the apparatus during recording. As shown best in FIG. 6, the means for carrying the apparatus can include two support rods 36A, 36B positioned within the cavity 12 that extend generally frontward and rearward and configured to rest on the forearms of the camera operator 1 when the operator's forearms extend forward, such as when grasping a handle or pistol grip 38 in front of the camera operator 1. By resting the support rods 36A, 36B on the forearms of the operator 1, the operator 1 is found to have significantly better directional control of the frame 16 compared to instances where the frame 16 rests on the operator's shoulders, though such a configuration is not explicitly excluded. For instance, by resting the frame 16 on the operator's forearms as opposed to the shoulders or head, the operator 1 can turn his/her torso and/or head substantially independent of the camera 75. This permits the operator 1 to more slowly pan the camera 75 one way or another to capture smooth footage, even when abruptly turning or looking one way or another. In addition, the camera operator 1 can more smoothly guide the camera 75 around tight corners or in tight rooms, such as into and out of bedrooms along a narrow hallway of a house, apartment, condominium or townhome (when the rod 64 is in a shortened position, such as about three feet or less). Still further, resting the frame 16 on the operator's forearms also allows the operator 1 additional upwards and downwards directional control over the frame 16 and thus camera 75, which may otherwise require the operator 1 bend backwards or forwards, risking a fall or other injury. The entire apparatus weighs less than 3 lbs.

The camera 75 itself can be controlled remotely using a computer or smart device such as mobile phone 40, tablet, laptop or the like. Accordingly, the support member 22 can also include a plurality of ports 42 for placing an adapter 44 for holding the suitable mobile phone 40, tablet, laptop or the like. Shown best in FIG. 5, feet 46 can also be provided so that the frame 16 can be set down on a table when not in use.

Returning to FIGS. 1-12 collectively, the front barrier 14, preferably has an upper segment 48 that extends downward from the upper arcuate member 18 and a lower segment 50 that extends downward from the lower arcuate member 20. Most preferably, the upper segment 48 is attached to the upper arcuate member 18 and reaches or overlaps with the lower segment 50 of the front barrier 14, which is preferably attached to the lower arcuate member 20 of the frame 16. As such, there is preferably no visible gap that exposes the operator 1 between the upper and lower segments 18, 20 of the front barrier 14.

The upper segment 48 is constructed to substantially prevent viewing into the cavity 12 but permits the operator 1 to view outward through the front barrier 14. This can be accomplished using different approaches, such as a two-way mirror or one-way film.

Figure 4:
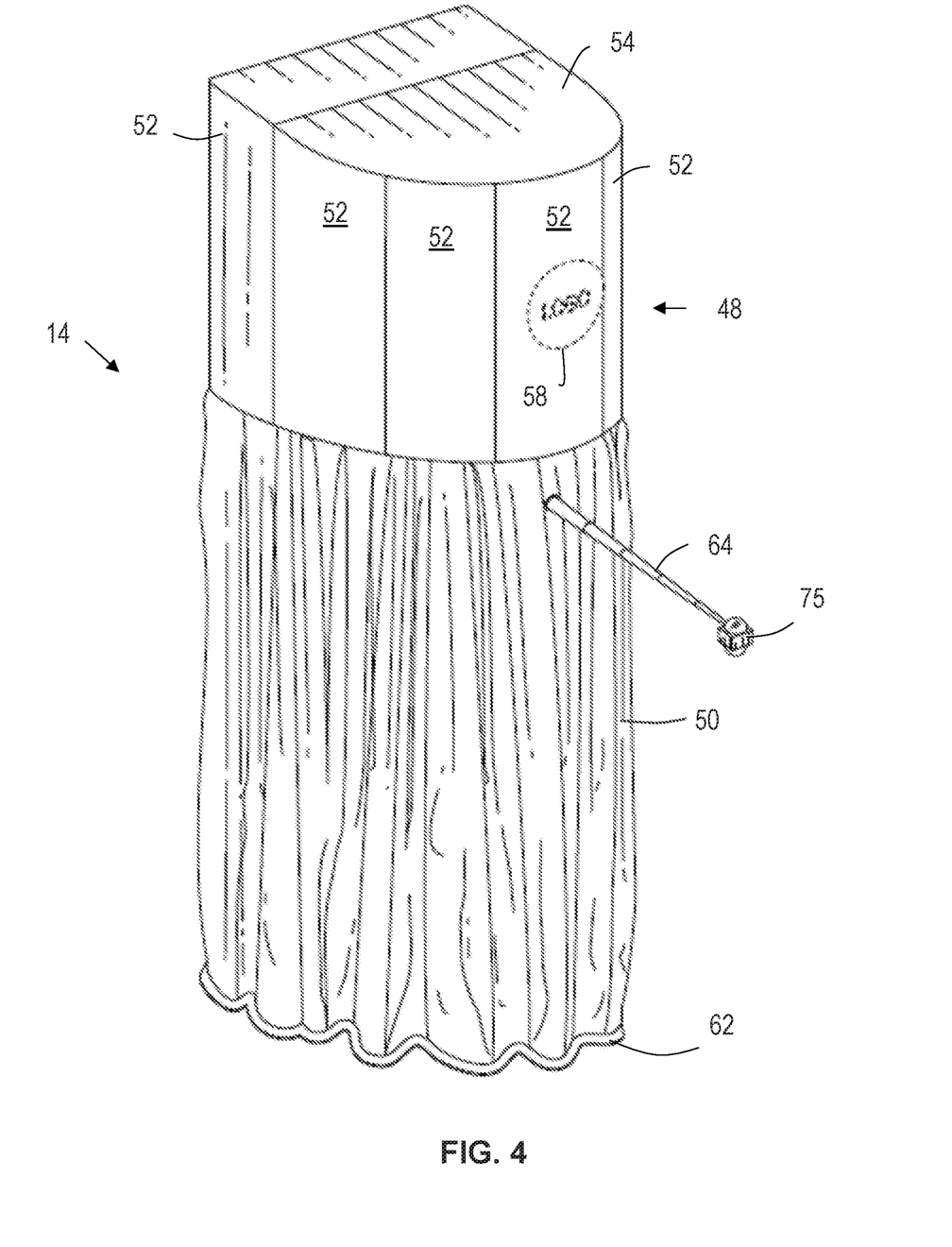
FIG. 4 depicts another exemplary embodiment of a camera apparatus 10 with a front rod 64 extending horizontally from the lower segment 50 of the front barrier 14 but having an upper segment 48 embodied as a series of two-way mirrors 52.
Figure 5:
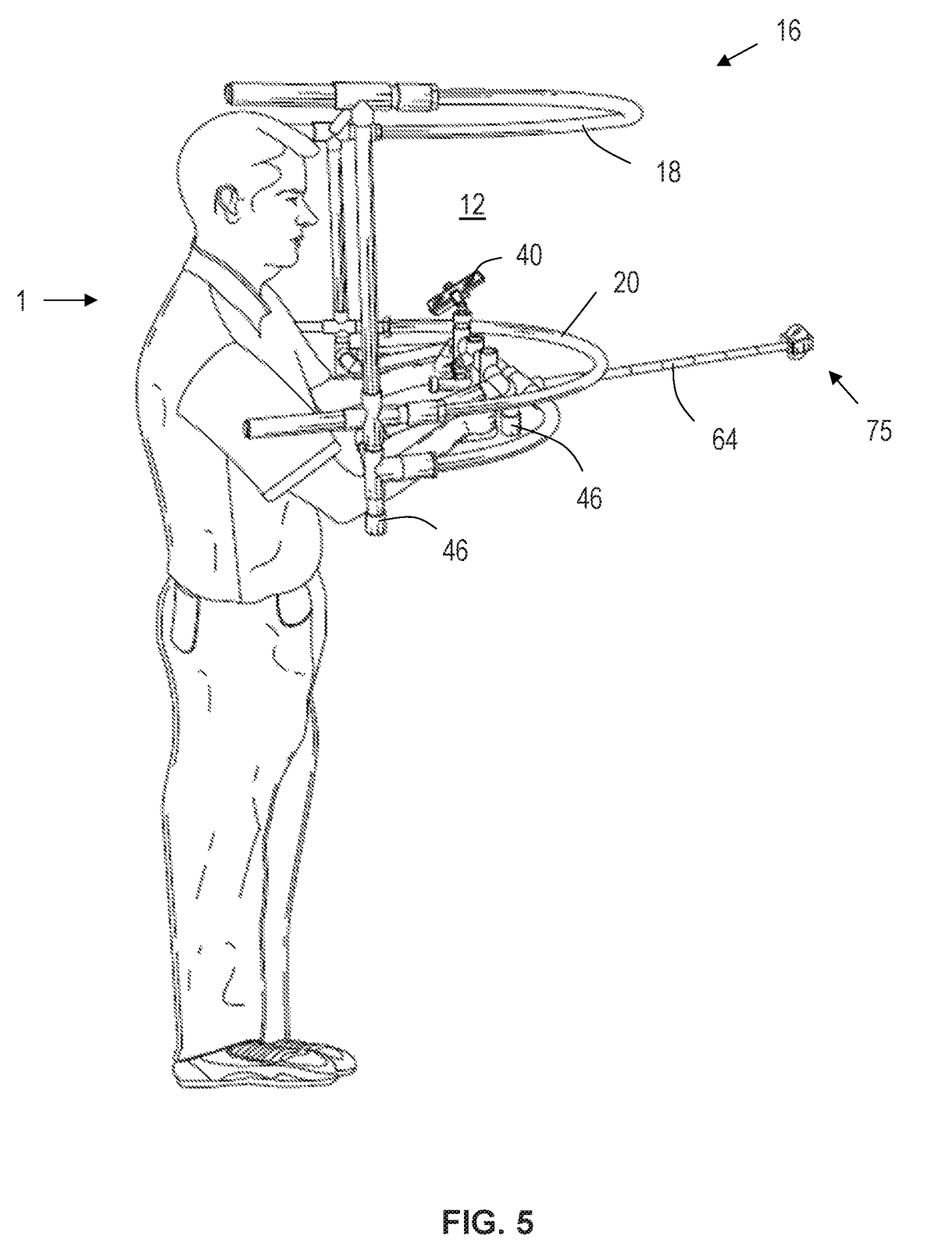
FIG. 5 demonstrates an exemplary cavity 12 within which the camera operator 1 controls the camera 75.
Figure 6:
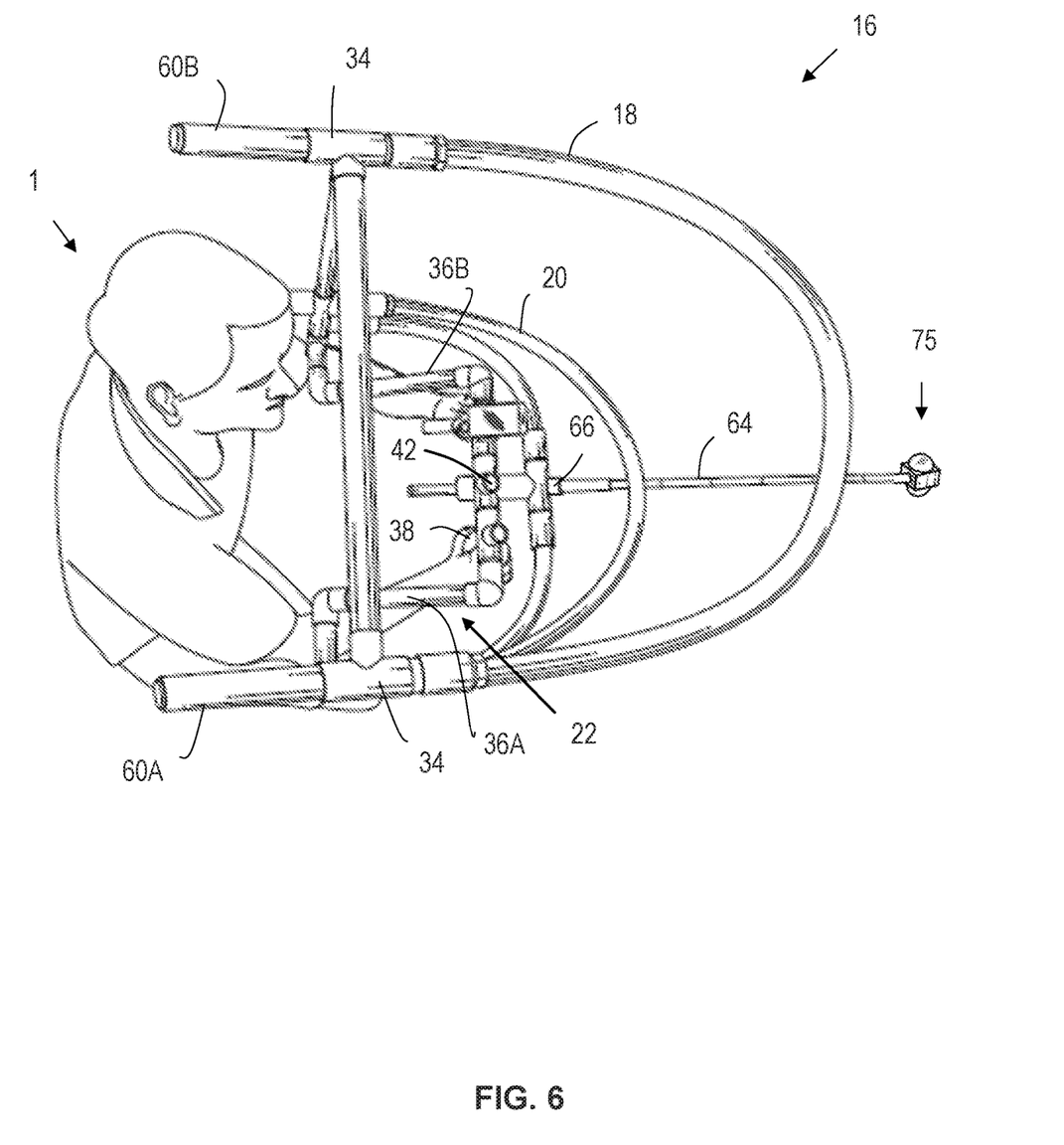
FIG. 6 is a perspective view showing the preferred method of carrying the frame 16.
Figure 7:
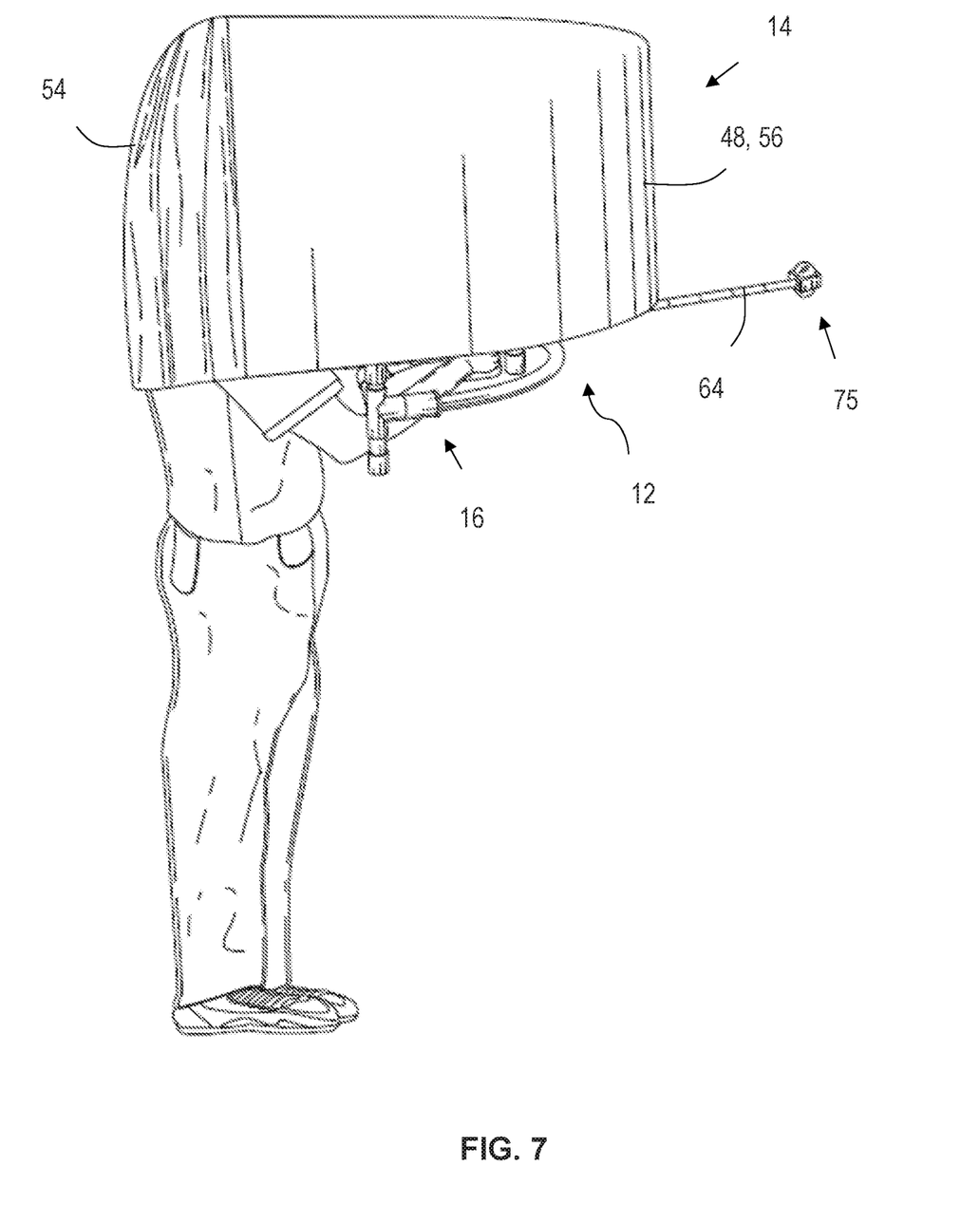
FIG. 7 demonstrates an exemplary orientation of the upper segment 48 of the front barrier 14 (embodied as a one-way film 56) in relation to the frame 16, and the draping of an opaque covering 54 behind and to about the middle of the operator's back to darken the cavity 12.
Figure 8:
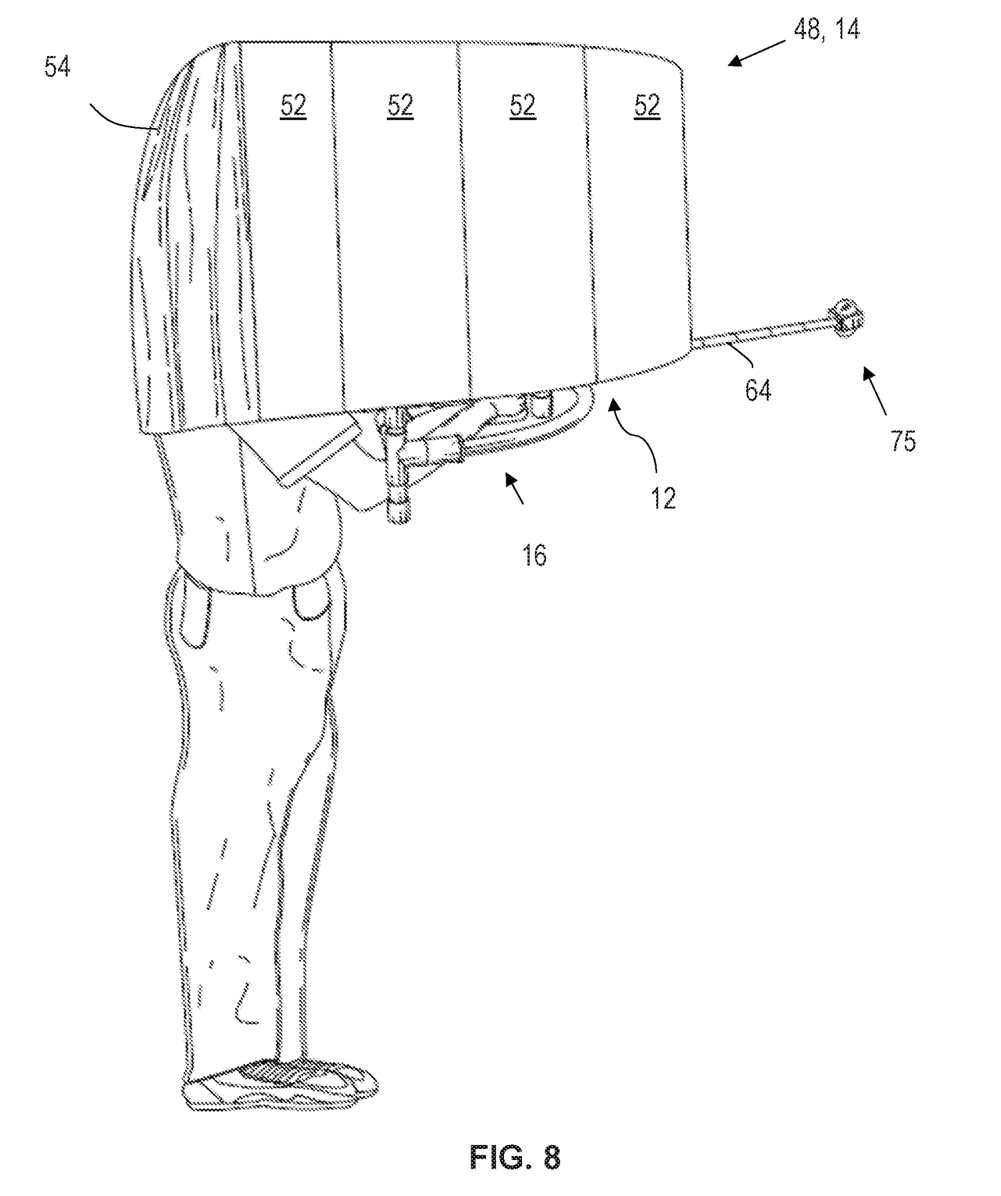
FIG. 8 demonstrates an exemplary orientation of the upper segment 50 of the front barrier 14 (embodied as a plurality of two-way mirrors 52) in relation to the frame 16, and the draping of an opaque covering 54 behind and to about the middle of the operator's back to darken the cavity 12.
Figure 9:
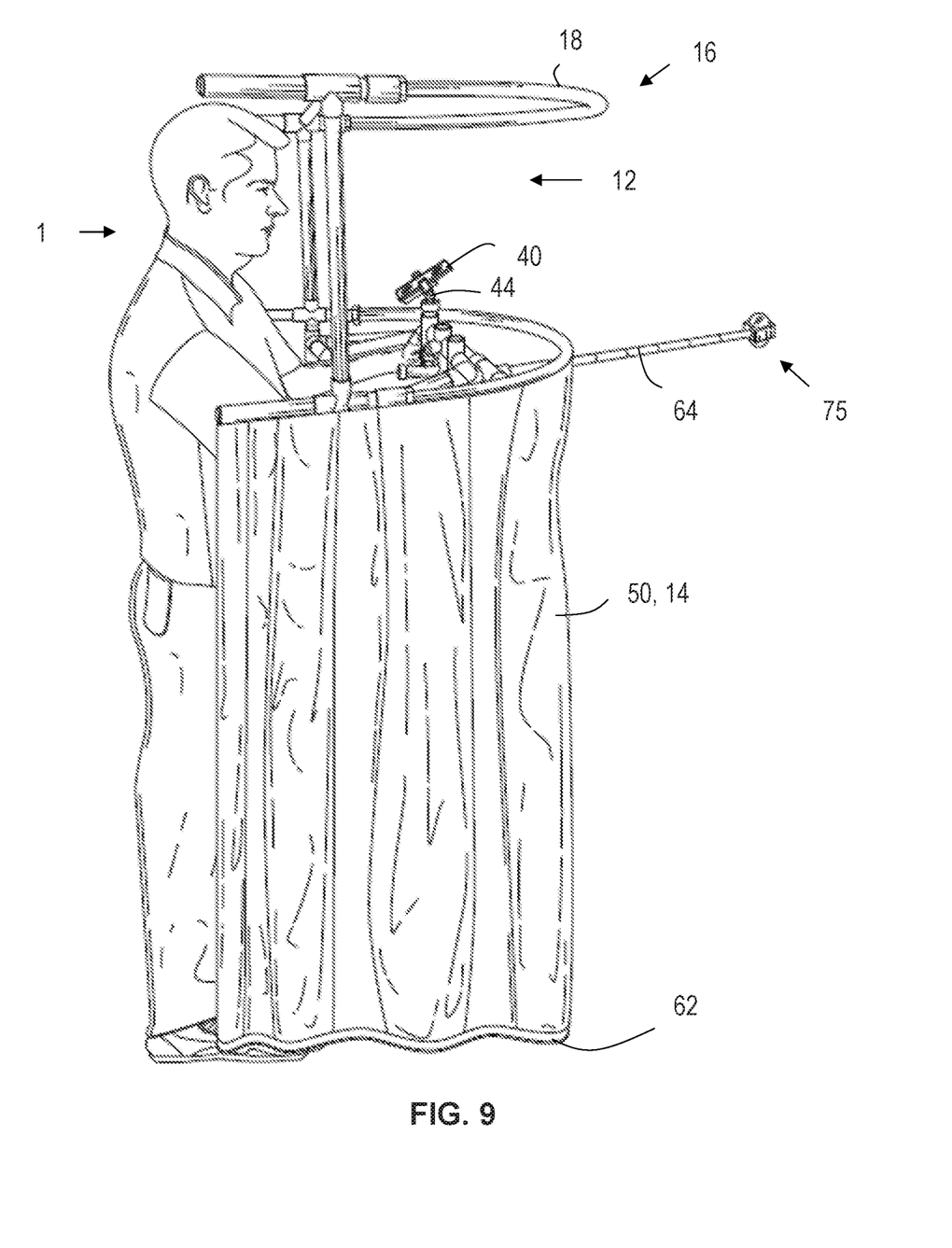
FIG. 9 demonstrates an exemplary orientation of the lower segment 48 of the front barrier 14 in relation to the frame 16.
Figure 10:
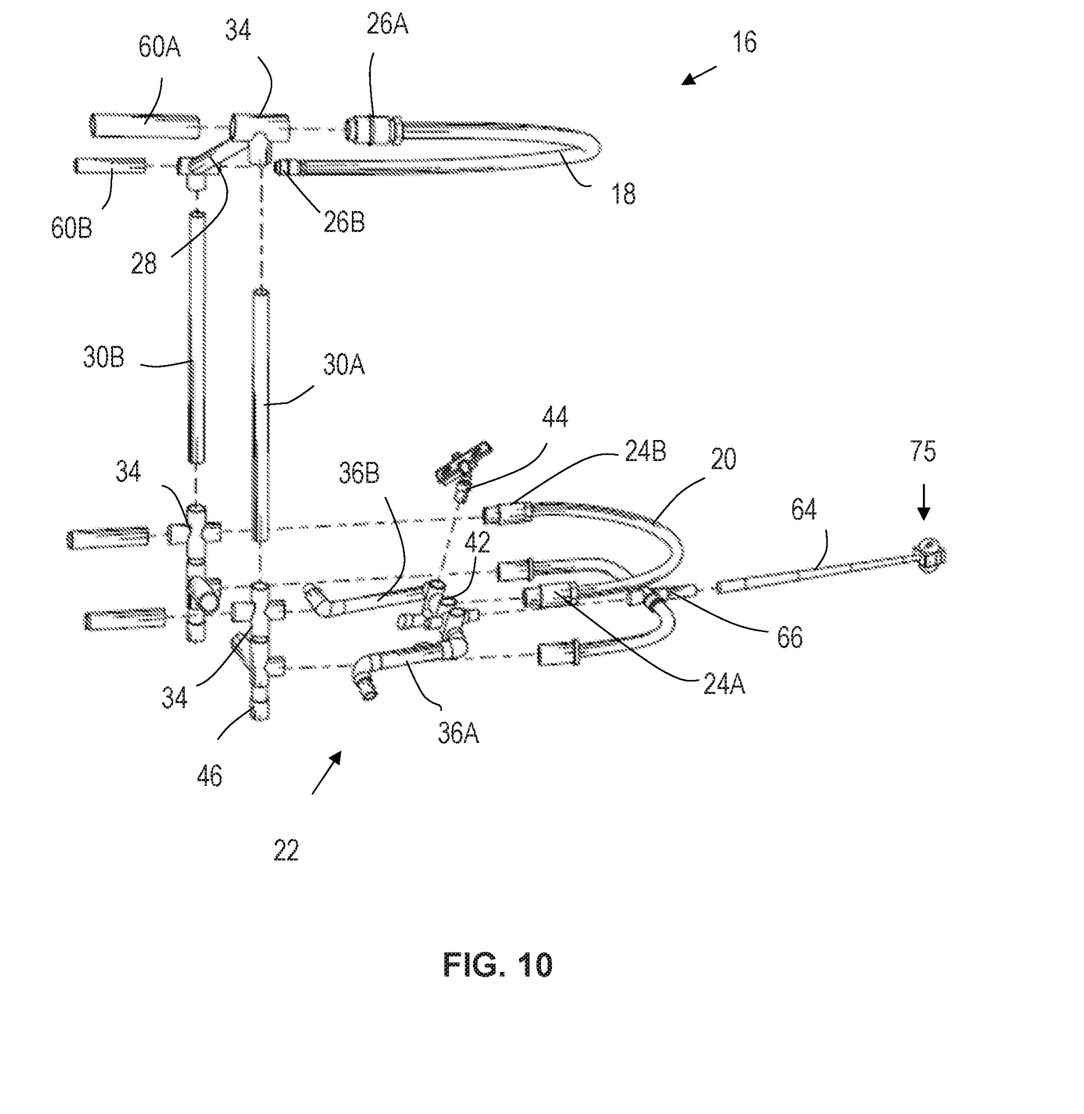
FIG. 10 is an exploded view of the frame 16, demonstrating how it can be collapsed for travel.

In the approach shown in FIG. 4, the upper segment 48 is formed using one or more two-way mirrors 52. A two-way mirror 52 (also sometimes referred to as see-through, surveillance, transparent or a one-way mirror) is reflective on one side and transparent on the other. Two-way mirrors 52 are well known in the art. They can be formed from glass or acrylic. Compared to a regular mirror, a two-way mirror 52 has a more sparsely applied reflective coating, which tends to reflect about half of the light that hits its surface while allowing the remaining light to pass. When the light is bright on both sides of the mirror 52, it will be more transparent, thereby allowing both sides to see through; however, when the light is much brighter on one side compared to the other, the brighter side acts like a mirror. As will be discussed in passages that follow, by using a two-way mirror 52 approach and darkening the cavity 12, such as by an opaque cover 54 over and behind the operator 1 (see FIG. 8), the camera operator 1 can see out while recording an environment that is more brightly lit (such as during daytime or under room lighting) yet cannot be substantially seen from outside the front barrier 14.

Figure 1:
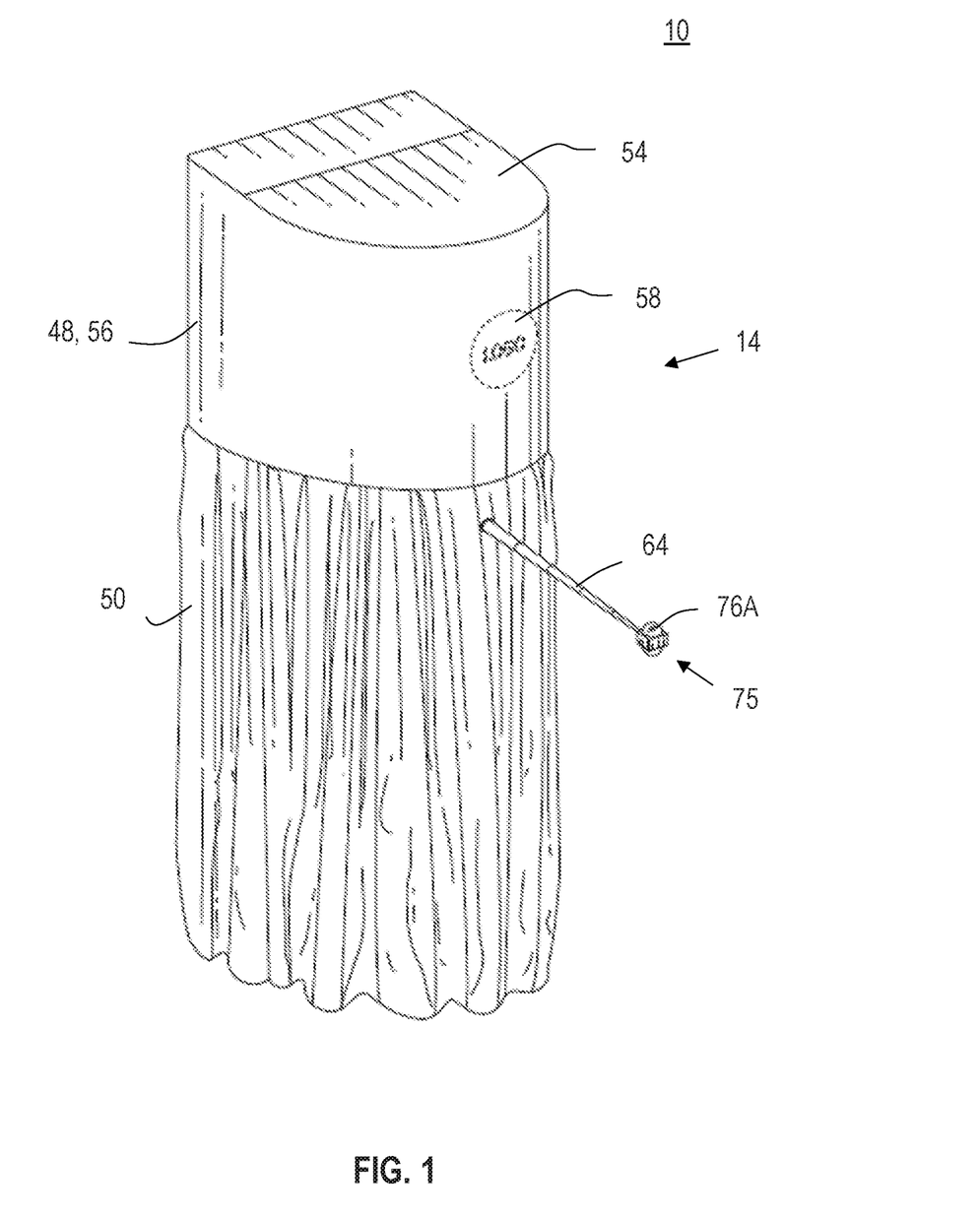
FIG. 1 depicts an exemplary embodiment of a camera apparatus 10 with a front rod 64 extending horizontally from the lower segment 50 of the front barrier 14 and having an upper segment 48 embodied as a one-way film 56.
Figure 2:
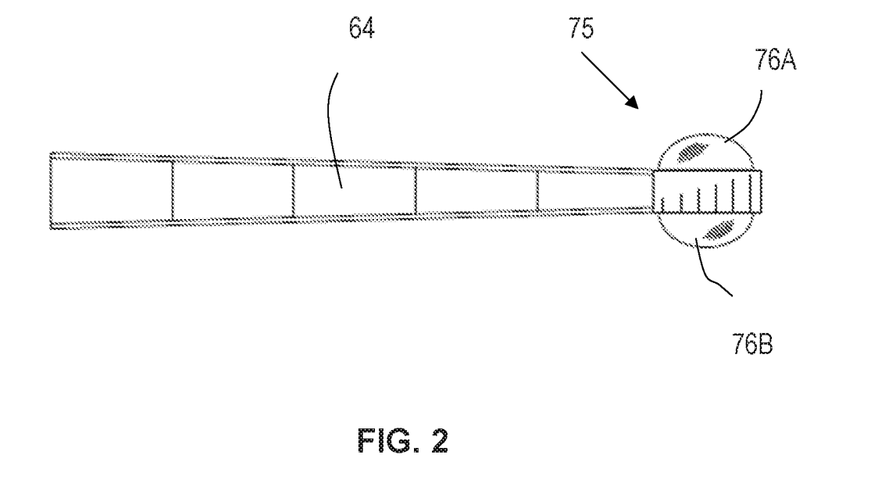
FIG. 2 depicts the 360-degree camera 75 mounted to a rod 64 so that opposing half dome lenses 76A, 76B face upwards and downwards.

Referring now to FIG. 1, in another approach, the front barrier 14 includes a one-way film 56 such as a perforated vinyl. Perforated vinyl is commonly used in the sign industry to make window signs that are opaque when viewed from the outside but transparent when viewed from the inside. Perforated vinyl is a sheet of vinyl with a pattern of tiny holes cut through it. The amount of vinyl removed usually ranges from 30 to 50%. For example, 60/40 vinyl is 60% vinyl and 40% holes. Perforated vinyl is opaque when seen from the outside because our eyes naturally focus on a bright well-lit surface rather than on the holes and the relative darkness found within the cavity 12 of the apparatus 10. The inner side of the perforated vinyl, however, is dark colored, which encourages our eye to focus through the dark vinyl to the light outside of the apparatus 10. Thus, by forming a dark operator cavity 12 and applying a perforated vinyl to a substrate such as acrylic or other transparent plastic, the camera operator 1 can see out of the apparatus 10; however, the 360-degree camera 75 will focus on the brighter exterior of the vinyl, thereby hiding the camera operator 1 from any captured footage. Moreover, advertising indicia 58 can be applied to the outer light side of the one-way film 56, which presents an advertisement 58 whenever the barrier 14 is viewed within the captured footage.

Turning back to FIGS. 1-12 collectively and as eluded to above, the cavity 12 itself is to be substantially darker than the surrounding environment during use. To this end, an opaque covering 54 is positioned over the frame 16 to form an opaque top and drapes over the rear of the frame 16 and the operator's head to hide the camera operator 1 (see FIG. 7 and FIG. 8). Since only the upper segment 48 of the front barrier 14 is typically constructed from a two-way mirror 52 or one-way film 56, and the camera 75 is held typically between the chest and waist, the opaque covering 1 only needs to extend downward to about the middle of the camera operator's back or to about the lower arcuate member 20. In some embodiments, the opaque covering 54 is an opaque fabric. In some embodiments, the frame 16 also includes rear extension members 60A, 60B that extend rearward from the upper arcuate member 18 to extend the opaque covering 54 outward to increase the size of the cavity 12 for the operator 1.

Returning back to the front barrier 14, the lower segment 50 preferably extends downward from the lower arcuate member 20. In some embodiments, the lower segment 50 is constructed from an opaque or reflective fabric and includes a sleeve for hanging, such that the lower arcuate member 20 is fed through the sleeve, thereby permitting the lower segment 50 to hang downward akin to drapes. In further embodiments, the lower segment 50 has a weighted bottom 62 to encourage the lower segment 50 to remain in its relative position to the frame 16 so that it is less likely to reveal the operator's feet as the apparatus 10 is moved through the environment. As such, the lower segment 50 preferably includes a means for height adjustment, such as hooks, snaps, zippers, buttons, hook and loop (VELCRO), so that the lower segment 50 can be adjusted to not substantially lie or drag on the floor/ground when in use.

Extending forward through the front barrier 14, preferably through the lower segment 50, is a rod 64 with a mirrored outer surface to position the camera 75 in front of the operator 1. The camera 75 is positioned so that two opposing half dome lenses 76A, 76B face upwards and downwards rather than forwards and backwards as currently used in the art. Preferably, the operator 1 can move the rod 64 inward and outward as desired from within the cavity 12, such as by collapsing or extending a series of telescopic segments. In some embodiments, the rod 64 slides through a sleeve 66 that is itself mounted to the frame 16. In other embodiments, the rod 64 has a retracting and extension mechanism that retracts and extends the rod 64. In some embodiments, the rod is attached to gearing such as spring-loaded elbows, connected to the frame 16, which permits side to side, up/down, and forward/backward movement of the camera 75.

Figure 3:
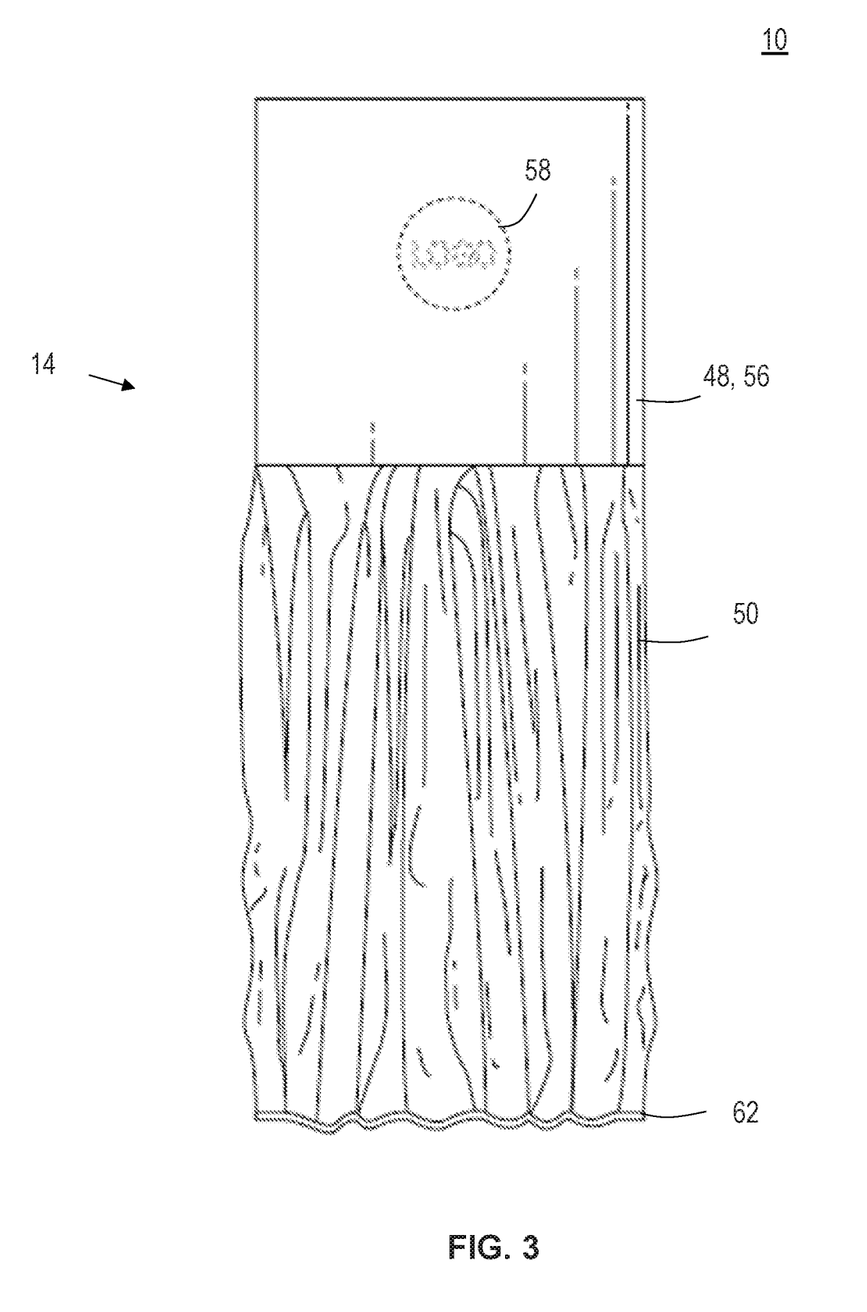
FIG. 3 is a front elevational view of the barrier 14 as seen from the 360-degree camera 75 of FIG. 1.

Shown best in FIG. 3, among the achievements described herein is the ability to both hide the camera operator 1 from view as well as the rod 64, which extends outward to hold the camera 75. As described above, the operator 1 is hidden by the presence of the front barrier 14. It was surprisingly found that the rod 64 can also hidden from recorded footage. That is, when viewing footage directed at the front barrier 14, the rod 64, which was predicted to be in view, was not. Without being bound by theory it is believed that the reflection of the surrounding environment may likely mask the presence of the rod 64 on the footage.

Referring again collectively to FIGS. 1-12, it has been further found that by covering the camera 75 with a reflective coating, such as an adhesive backed reflective tape or mirror, the camera 75 can also be hidden from footage. That is, when conducting a video tour of a home one challenge was that when entering rooms having a mirror, the reflection of the camera 75 was captured. This challenge was eventually solved by applying reflective material or small mirrors, on the sides of the camera 75. Once applied, the recorded footage did not reveal the presence of the rod 64 or camera 75.

In view of the above, also disclosed is a method of capturing a 360-degree image video tour of an environment. The method includes mounting a 360-degree camera 75 to the rod 64 of the camera apparatus 1 so that half dome lenses 76A, 76B face upwards and downwards; and carrying the camera apparatus 10 throughout the environment by means of the support member 22 while filming 360-degree video or images, where the camera 75 is maintained in front of the camera operator 1 and between about chest and waist height. When recording, the camera operator 1 and the rod 64 are hidden from the recorded footage. In addition, when applying reflective surface to the camera 75, the camera 75 is also hidden from recorded footage when directed at a mirror.

The invention described herein may be embodied in other specific forms without departing from the spirit or essential characteristics thereof. The specific embodiments previously described are therefor to be considered as illustrative of, and not limiting, the scope of the invention.

LISTING OF REFERENCES

1 Camera Operator
10 Apparatus
12 Cavity
14 Front Barrier
16 Frame
18 Upper Arc Member
20 Lower Arc Member
22 Support Member
24A, 24B End Regions
26A, 26B End Regions
28 Transverse Rod
30A, 30B Vertical Rods
32 Container
34 Cross-Fitting
36A, 36B Support Rods
38 Pistol Grip
40 Mobile Phone
42 Port
44 Adapter
46 Foot
48 Upper Segment
50 Lower Segment
52 Two-Way Mirror
54 Opaque Covering
56 One-way Film
58 Advertising
60A, 60B Rear Extensions
62 Weighted Bottom
64 Rod
66 Sleeve
75 Camera
76A, 76B Half Dome Lens

What is claimed is:

1. A camera apparatus for hiding a camera operator while recording 360-degree images or video, the apparatus comprising:
   A) a frame having upper and lower arcuate members, each arcuate member having an arc of about 180 degrees, thereby forming an operator cavity; and a support member positioned within the cavity, the support member including a means for carrying the apparatus by the camera operator while recording images or video;
   B) a front barrier following the arcuate members that substantially prevents viewing into the cavity, the front barrier having an upper segment that extends downward from the upper arcuate member and permits one way viewing out of the operator cavity, and a lower segment that extends downward from the lower arcuate member;
   C) a rod movably mounted to the frame and extending forward through the front barrier, wherein a distal end of the rod is configured for attachment to a camera that captures 360-degree images or video and the rod has a mirrored outer surface along its length, thereby masking the presence of the rod in camera footage; and
   D) an opaque covering positioned over and behind the frame, thereby forming a top and rear member.

2. The camera apparatus of claim 1, wherein the frame comprises an adjustable height that adjusts the relative distance between the upper and lower arcuate members.

3. The camera apparatus of claim 1, wherein the apparatus is configured for disassembly and reassembly, wherein when disassembled the camera apparatus is configured for storage in a container sized 30 inches×24 inches×9 inches.

4. The camera apparatus of claim 1, wherein the support member comprises support rods positioned to rest on the camera operator's forearms during recording.

5. The camera apparatus of claim 1, wherein the support member comprises hand grips and optionally a mobile phone holder.

6. The camera apparatus of claim 1, wherein the support member comprises feet for standing the recording apparatus on a table.

7. The camera apparatus of claim 1, wherein the upper segment comprises a two-way mirror.

8. The camera apparatus of claim 1, wherein the upper segment comprises a one-way window film.

9. The camera apparatus of claim 1, wherein the upper segment comprises advertising indicia that is only viewable outside of the camera apparatus.

10. The camera apparatus of claim 1, wherein the lower segment comprises a fabric skirt with a weighted bottom.

11. The camera apparatus of claim 1, wherein the lower segment comprises a fabric skirt with means for height adjustment.

12. The camera apparatus of claim 1, wherein the rod is slidably positioned through a rigid sleeve that is mounted to the frame.

13. The camera apparatus of claim 1, wherein the rod extends from 6 inches to 9 feet in front of the front barrier.

14. The camera apparatus of claim 1, wherein the opaque covering is an opaque fabric.

15. The camera apparatus of claim 1, further comprising rear extension members that extend rearward from the cavity, which guide the opaque covering.

16. The camera apparatus of claim 1, further comprising a 360-degree camera positioned at the distal end of the rod.

17. The camera apparatus of claim 16, wherein the camera is covered with a mirrored substrate.

18. A method of capturing a 360-degree image or video tour, while continually walking/moving in an environment without capturing the camera operator in the image or video footage, the method comprising:
   A) mounting a 360-degree video camera to the rod of the camera apparatus of claim 1; and
   B) carrying the camera apparatus throughout an environment by means of the support member while continually walking/moving and recording 360-degree video, wherein the camera is maintained in front of the camera operator and between about chest and waist height, wherein the camera operator and rod are hidden from the video.

* * * * *